May 20, 1969
J. E. ZIMMERMAN
3,445,760
SUPERCONDUCTIVE MAGNETOMETER IN WHICH SUPERCONDUCTIVE
ELEMENTS DEFINING A MAGNETIC CONDUIT ARE
CONNECTED BY WEAK LINKS
Filed March 9, 1966
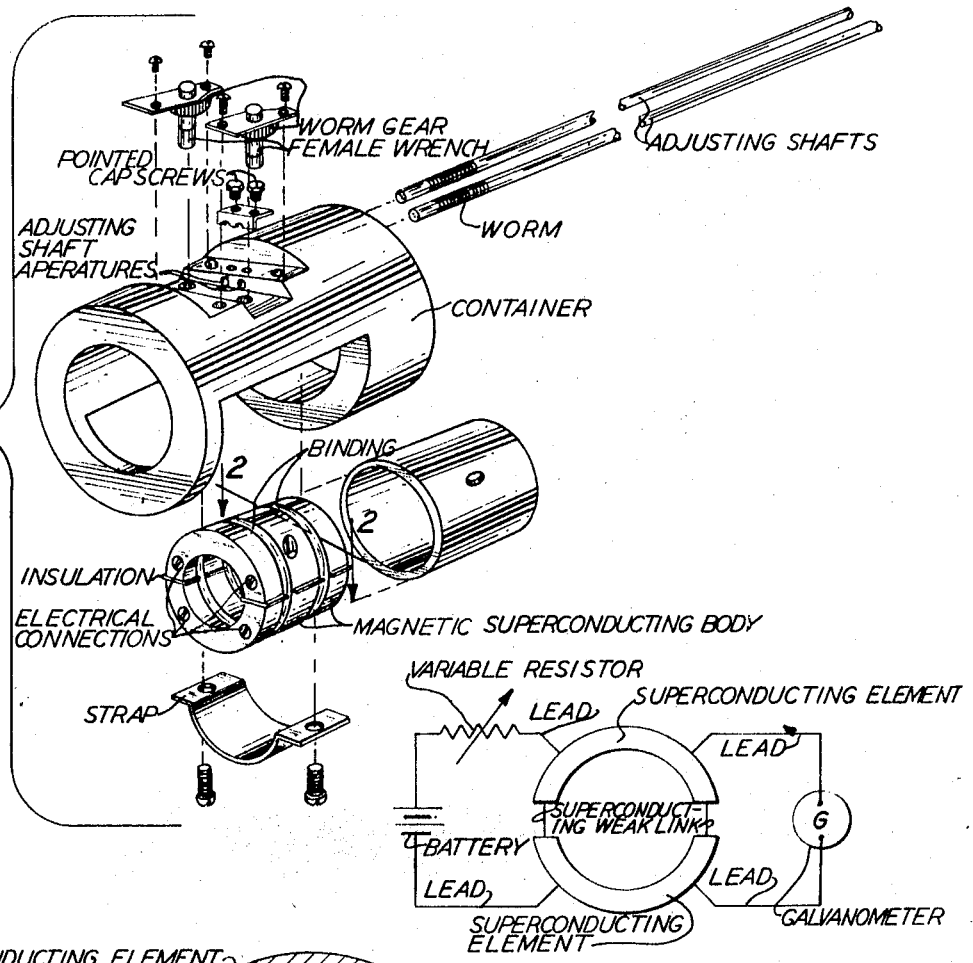
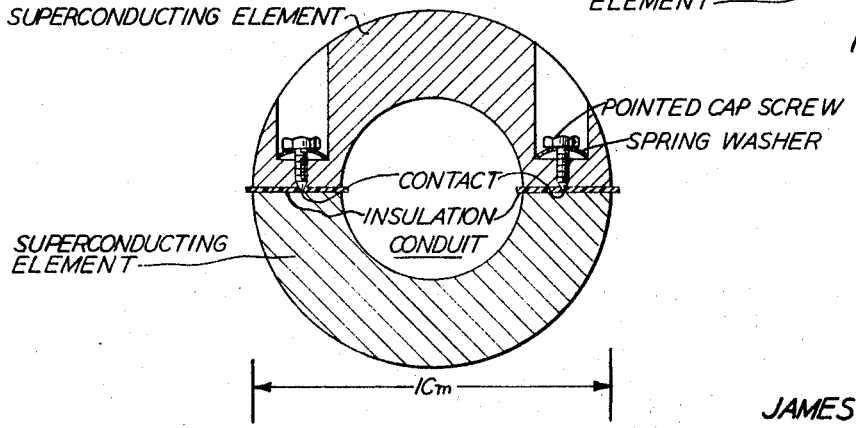
JAMES E. ZIMMERMAN
INVENTOR.
BY
ATTORNEYS United States Patent Office 3,445,760
Patented May 20, 1969

3,445,760
SUPERCONDUCTIVE MAGNETOMETER IN WHICH SUPERCONDUCTIVE ELEMENTS DEFINING A MAGNETIC CONDUIT ARE CONNECTED BY WEAK LINKS
James E. Zimmerman, Dearborn, Mich., assignor to Ford Motor Company, Dearborn, Mich., a corporation of Delaware
Filed Mar. 9, 1966, Ser. No. 533,028
Int. Cl. G01r 33/02; H03k 3/38
U.S. Cl. 324—43
8 Claims

ABSTRACT OF THE DISCLOSURE

An instrument having the ability to detect and measure very weak magnetic fields in the submicrogauss range. A pair of superconductive elements defining a magnetic conduit therebetween are connected by a pair of superconducting weak links. The magnetic field in the conduit is determined by introducing electric current to the superconducting elements and measuring the voltage developed between these elements.

---

This invention relates to a superconductive magnetometer.

The object of this invention is to provide a magnetometer notable for its ability to detect very weak magnetic fields in the submicrogauss range. The indicated sensitivity of this device is of the order of fields of $10^{-10}$ gauss.

This invention is explained in the light of the drawings in which:

FIGURE 1 is an exploded view of the parts of a magnetometer assembly constructed in accordance with this invention;

FIGURE 2 is an end view, partially in section, of the magnetometer element of the magnetometer assembly of FIGURE 1; and FIGURE 3 is a schematic representation of one form of circuit used in conjunction with the magnetometer of FIGURES 1 and 2.

The preferred form of this magnetometer is shown in FIGURE 2 and comprises two metal superconducting elements joined together to an insulating separator. This joint may be made of any suitable adhesive. The insulating separator is preferably a plastic material such as that available commercially as "Mylar." The two superconducting elements unite to form a conduit in the form of a central passageway through the body of the magnetometer. A suitable dimension for the outside diameter of the magnetometer shown in FIGURE 2 is 1 cm.

The magnetometer will be oriented so that a sample of the magnetic field to be measured will pass through this central conduit. This central conduit may be in the form of a double funnel-shaped opening, having the least cross-sectional area near the center of the magnetometer, so as to concentrate the magnetic flux to be measured near the center of the device. Of course, the central conduit may be of any other desired shape.

Electrical contact is made between the two superconducting elements of the magnetometer by means of two pointed cap screws that function as contact points and are received in suitable openings in one of the superconducting elements. The sharpened ends of the cap screws penetrate the insulation between the two superconducting elements permitting the flow of electrical current. By the adjustment of these two cap screws, the maximum supercurrent through the magnetometer can be regulated. The significance of this supercurrent will be explained below.

Electrical connections, seen in FIGURE 1, are provided to permit current to be introduced into and flow out of the magnetometer and to permit a suitable electrical connection for the measurement of voltage developed between the two superconducting elements. The significance of this arrangement will be explained below.

The two superconducting elements and the cap screws are fabricated from metal capable of becoming superconductive at low temperature. These metals are well known. In the actual construction of the working magnetometer, vanadium was employed as the two superconducting elements and the cap screws were niobium, although this invention is by no means so limited.

An example of one form of magnetometer assembly adapted to include the magnetometer of FIGURE 2 can be seen in FIGURE 1. Suitable binding surrounds the superconducting elements to insure against separation. The magnetometer body is inserted in a cylindrical insulator. A hollow cylindrical container, having one portion thereof cut away, is adapted to reecive the magnetometer and cylindrical insulator. A suitable mounting is achieved by means of a strap partially surrounding the cylindrical insulator and attached to the container body by means of suitable fasteners.

Formed in the body of the container opposite the cutaway portion thereof is a slot of varying depth. Passageways are formed from this slot through the wall of the container to permit the passage of the pointed cap screws serving as contact points. A pair of female wrenches are mounted in the slot by means of suitable brackets and fasteners and are adapted to cooperate with the heads of the pointed cap screws. Formed integral with the shafts of these wrenches are worm gears. Longitudinal passageways are formed from the slot to one end wall of the container to permit the passage of adjusting shafts having worms formed near one end thereof. It may be seen that these worms cooperate with the worm gears so that rotation of the adjusting shafts will cause rotation of the pointed cap screws, thereby adjusting the electrical contact between the superconducting elements of the magnetometer.

A complete understanding of the instant invention requires a knowledge of the operation of multiple junction superconducting quantum interference devices. For a theoretical explanation of the operation of such devices, attention is directed to copending U.S. application Ser. No. 445,191, filed Apr. 2, 1965, and now abandoned, and assigned to the assignee of the instant application. However, such a theoretical explanation is not necessary for one having skill in the art to construct and use the magnetometer of this invention.

One form of circuit which may be used in the operation of this device is seen in FIGURE 3 of the drawings. A suitable current source such as the illustrated battery is connected to conducting leads to each of the two superconducting elements of the magnetometer. A variable resistor is connected in circuit with the current source and the magnetometer to control the amount of current applied to the magnetometer body. A galvanometer is connected by means of suitable conducting leads to the two superconducting elements of the magnetometer and across one of the pointed cap screws.

In operation, the magnetometer is first cooled until the metals are all in the superconductive state. A suitable temperature to accomplish this has been found to be 4° K. The magnetic field to be measured is located in the conduit defined by the two superconducting elements of the magnetometer. The pointed cap screws are adjusted so as to pierce the insulation and allow the passage of current between the two superconducting elements. These screw contact points form what is commonly known in the art as "weak links."

For a particular setting of the pointed cap screws serving as contact points, the maximum supercurrent between the superconducting elements varies periodically with the magnetic flux passing through the conduit. This periodicity is about $2 \times 10^{-7}$ gauss cm.$^2$ (lines). The maximum supercurrent is defined as the minimum current that produces a voltage across the weak link because when the maximum supercurrent is reached, the superconducting elements loose their property of being superconductive. The magnitude of the magnetic fields corresponding to maximum superconducting currents of varying magnitudes can easily be computed for a particular setting of the screw contact points.

Therefore, current is applied into and out of the magnetometer body. Due to the superconducting nature of the metals involved, no electrical resistance is encountered and no voltages are produced around the magnetometer. By adjustment of the variable resistor, the magnitude of the current applied to the magnetometer is increased. When the maximum superconducting current is reached, a voltage is developed across the weak link. This voltage will produce an instantaneous deflection of the galvanometer allowing the maximum superconducting current to be determined easily. Since this maximum superconducting current is a function of the magnetic flux passing through the central conduit of the magnetometer, the magnitude of this magnetic flux easily may be determined.

It should be obvious to one having ordinary skill in the art that the usage of this magnetometer is not limited to the particular circuitry shown in FIGURE 3. For example, in place of the DC current source illustrated in FIGURE 3 an alternating current source could be provided. In such an arrangement, the voltage characteristics could easily be displayed on an oscilloscope.

The particular magnetometer described has been shown as fabricated from two superconducting elements and having two weak links. It is emphasized that this magnetometer configuration is not the only possible shape. In particular, several weak links enclosing a variety of areas could be used to enhance the sensitivity of the device. Therefore, it is obvious that the instrument could be fabricated from any desired number of parts and that the central conduit or conduits may take any desired shape.

I claim:

1. A magnetometer comprising a plurality of superconductive elements, first portions of each of said elements being adjacent and separated only by electrically insulating material, second portions of each of said elements being spaced apart to define at least one magnetic conduit between said elements, at least one electrical superconductive contact connecting two of the conducting elements, said contact being a superconductive weak link, and means associated with said magnetometer for energizing said magnetometer and sensing electrical changes therein varying with the strength of a magnetic field present in said conduit.

2. The magnetometer of claim 9, wherein said superconductive elements comprise two semicylindrical members defining a magnetic conduit.

3. The magnetometer of claim 9, wherein said electrical superconductive contact comprises an adjustable threaded member.

4. A magnetometer comprising two superconductive elements having adjacent first portions separated only by electrical insulation and spaced apart second portions defining a magnetic conduit between said elements, at least two superconductive contacts electrically interconnecting said elements at said first portions through said insulation, said contacts being superconductive weak links, and means associated with said magnetometer for energizing said magnetometer and sensing electrical changes therein varying with the strength of a magnetic field present in said conduit.

5. The magnetometer of claim 4, wherein said electrical superconductive contacts are adjustable threaded members.

6. The magnetometer of claim 5, including control means for adjusting said threaded members remote from said magnetometer.

7. A magnetometer comprising a pair of arcuate superconductive elements separated by insulation and secured together to define a magnetic conduit, at least two electrical superconductive contacts connecting adjacent faces of the superconductive elements, said contacts being adjustable threaded members extending through said insulation, first means electrically connected to said elements for passing current into and out of said members, and second means electrically connected to said elements for measuring the electrical potential developed across said contacts.

8. The magnetometer of claim 7, including control means for adjusting said threaded members remote from said magnetometer.

References Cited

UNITED STATES PATENTS 2,936,186   5/1960   Dunmire _____ 24—279
3,292,160   12/1966  Crittenden _____ 307—245

RUDOLPH V. ROLINEC, *Primary Examiner.*

R. J. CORCORAN, *Assistant Examiner.*

U.S. Cl. X.R.

307—212, 245, 306

UNITED STATES PATENT OFFICE
CERTIFICATE OF CORRECTION

Patent No. 3,445,760                                                      May 20, 1969

James E. Zimmerman

It is certified that error appears in the above identified patent and that said Letters Patent are hereby corrected as shown below:

Column 4, lines 4 and 7, the claim reference numeral "9", each occurrence, should read -- 1 --.

Signed and sealed this 21st day of April 1970.

(SEAL)
Attest:

Edward M. Fletcher, Jr.                              WILLIAM E. SCHUYLER, JR.
Attesting Officer                                              Commissioner of Patents